May 6, 1930. J. C. SHAW ET AL 1,757,929
WORK POSITIONING MECHANISM FOR MACHINE TOOLS
Filed June 9, 1925 3 Sheets-Sheet 3
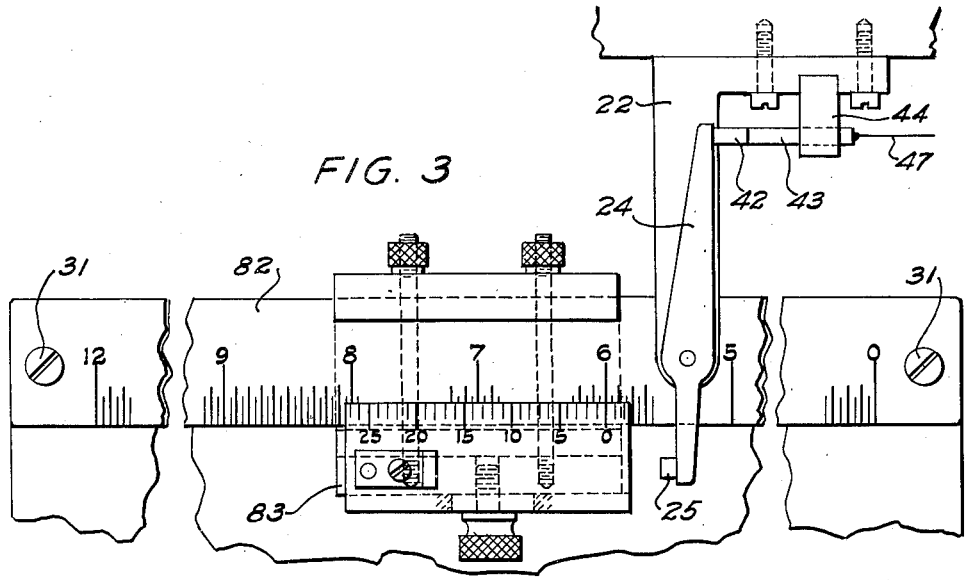
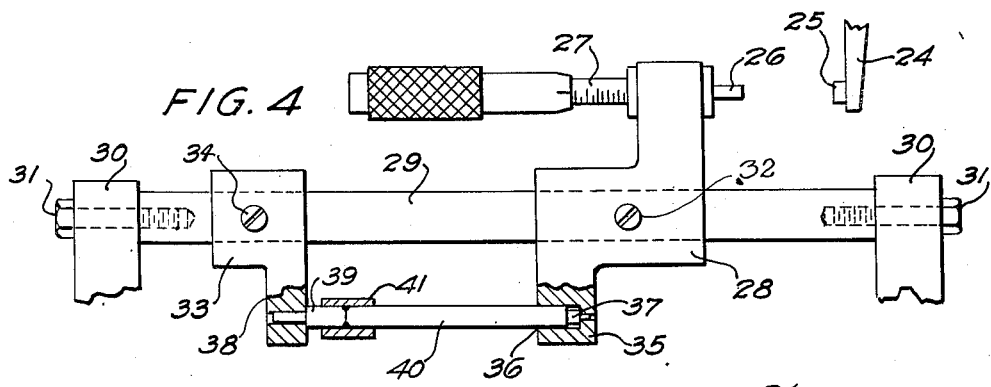
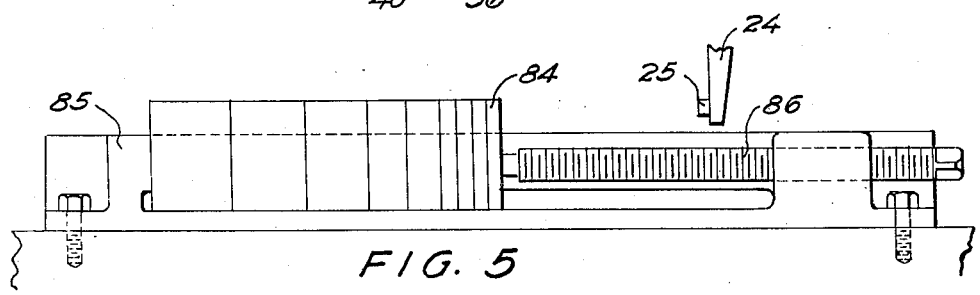

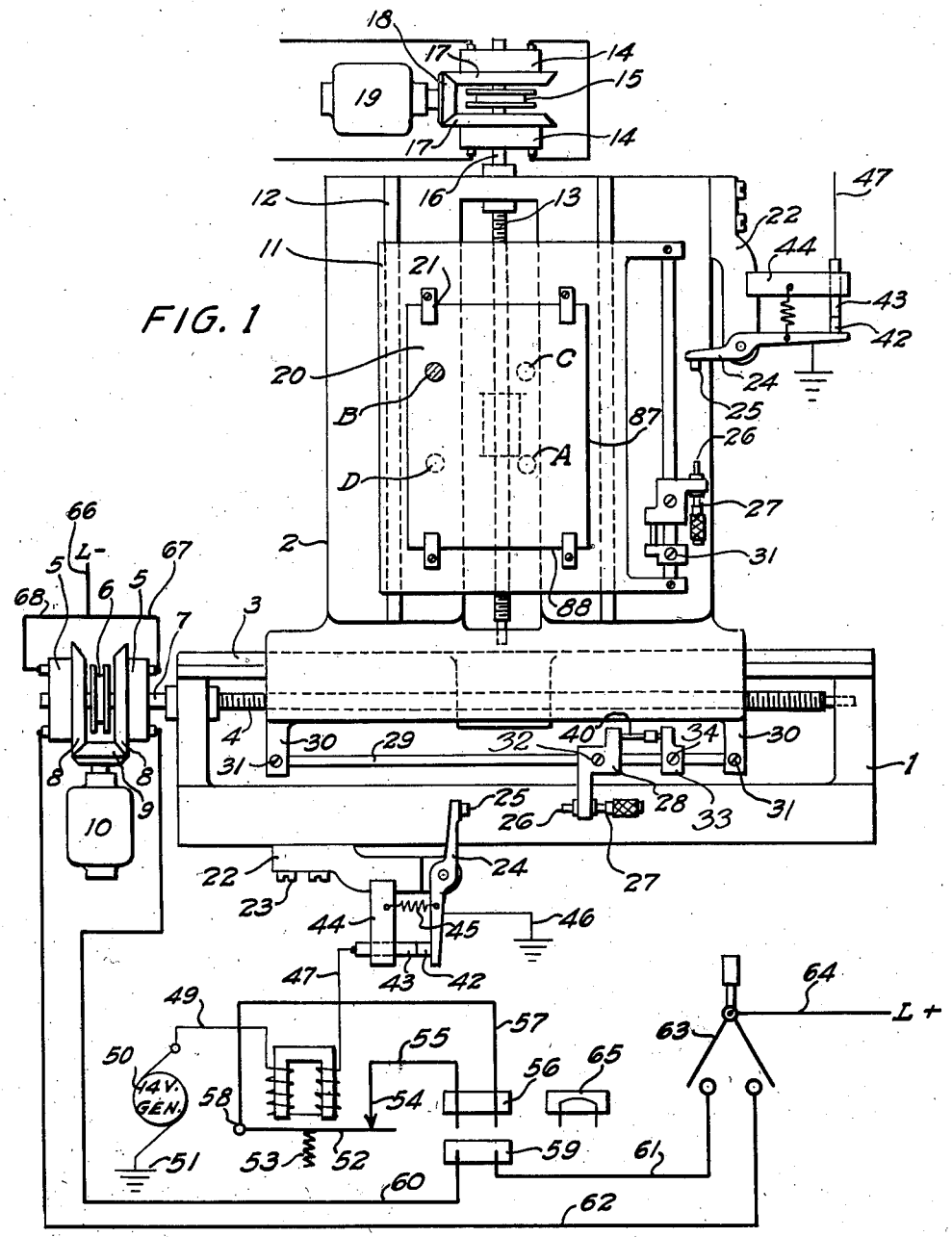

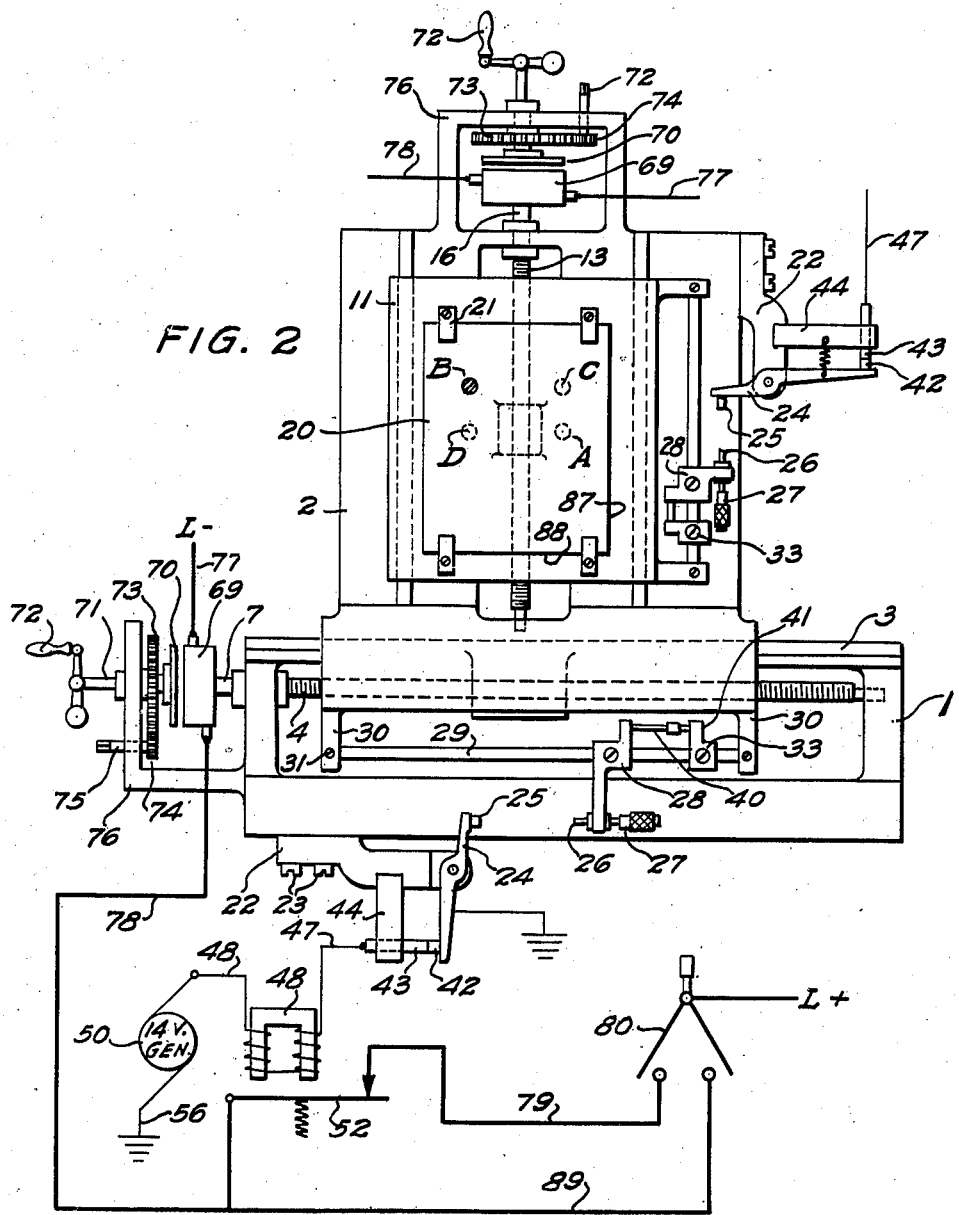

Patented May 6, 1930

1,757,929

UNITED STATES PATENT OFFICE

JOHN C. SHAW AND ROBERT D. SHAW, OF BROOKLYN, NEW YORK, ASSIGNORS TO KELLER MECHANICAL ENGINEERING CORPORATION, OF BROOKLYN, NEW YORK, A CORPORATION OF NEW YORK

WORK-POSITIONING MECHANISM FOR MACHINE TOOLS

Application filed June 9, 1925. Serial No. 35,959.

Our invention relates more particularly to an improved method of establishing a zero point and laying out various points therefrom, where it is desired to perform various tool operations upon the work in machine tools provided with magnetic clutches controlling the screw feed of the work supporting table or slide, whereby it is possible to eliminate mechanical errors in the feed screw and accurately locate various points on the work. In laying out work, it has been the practice heretofore to locate the position of the tool or the work, mounted on a carriage adapted to be moved by a feed screw, by means of the graduated thimble associated with the screw and, hence, any errors in the screw, due to inaccuracies in cutting the threads or to wear, will be cumulative.

Therefore, the primary object of our improvement is to provide a system or method for laying out work on hand operated laying out tables or on machine tools, which will completely eliminate any mechanical error that ordinarily results from inaccuracies in the screw or which may be due to wear or to careless or inaccurate adjustment or setting of the thimble associated with the screw. This is accomplished with our improved method by interposing, in the power drive of the feed screw, a magnetic clutch, the circuit of which is adapted to be controlled by a contact carried by a lever mounted in position to be actuated by an adjustable element, between which and the contact lever there is relative movement by the feed screw. The adjustment of the adjustable element is such that by permitting said element to operate the lever, to break the contact, a zero point is established, after which the adjustable element may be moved and secured at any desired accurately measured distance from the established zero corresponding to the location on the work of the spot to be operated upon. Then, under the feed of the screw the adjustable element may again be brought into position to break the contact by engaging the lever to thereby stop the feed and accurately locate the desired point. In this manner, the laying out and locating of various points on jig plates and other work in connection with lathes, milling machines, die sinking machines, planers, shapers, drill pressers, and various other types of machines, with which our improvement is adapted to be associated, may be performed with great accuracy and efficiency without the necessity of employing complicated methods for locating the desired points on the work.

A further object is to provide a magnetic clutch for driving the feed screw and interposing in the circuit thereof a relay, controlled by a contact carrying member, the contact of which is adapted to be broken by a member which is movable relatively thereto by action of the screw feed, and, therefore, when the relatively movable members are brought into engagement, the contact will be broken so that, through the relay, the magnetic clutch will be deenergized to stop the feed of the screw, thereby establishing or locating the desired point in connection with the work.

A further object is to provide accurate means for adjusting the relation between the contact carrying lever and the element for moving said lever to break the contact, the arrangement being such that standard vernier scales, micrometers and measuring rods, or gauge blocks may be employed for accurately establishing the measurements required without the necessity of depending upon adjustments of the screw, thereby eliminating possible errors from this source.

For the purpose of illustration, we have shown graphically in the accompanying drawings various adaptations of our improved lay-out system, in which Fig. 1 represents a die sinking or milling machine with our improvement, together with the wiring diagram which may be considered typical for power driven machine tools having a carriage movable in two rectangular directions; Fig. 2 is a similar diagrammatic view, representing our improvement as applied to a hand operated laying out table; Fig. 3 is an enlarged fragmentary view of our improvement, using a vernier scale; Fig. 4 is an enlarged view of the measuring feature in which a micrometer and measuring rods are used, and Fig. 5 represents a measuring device, employing Johannson blocks.

Referring to the drawings, Fig. 1 shows, diagrammatically, an arrangement, which is more particularly adapted for die sinking machines, milling machines and the like, the bed being represented at 1, upon which the pillar slide or carriage 2 is mounted, the latter being adapted to be fed along ways 3 by the usual feed screw 4. The feed screw 4, in the present instance, is adapted to be rotated by means of magnetic clutches 5, which cooperate with clutch discs 6, slidably keyed to the outer end 7 of the feed screw. The magnetic clutches 5 are provided with bevel gears 8 engaging a bevel pinion 9 driven by the motor 10, to thereby rotate the respective magnetic clutches in opposite directions. By this construction, it will be seen that, by energizing one or the other of the magnetic clutches 5 the disc 6 will be attracted by one clutch or the other and the screw 4 will feed the pillar slide 2, in one direction or the other according to which of the magnetic clutches is energized. In the present instance, the magnetic clutch 5, at the right in Fig. 1, is adapted to control feed of the carriage or pillar slide 2 from right to left. A work supporting carriage or slide 11 is preferably mounted upon ways 12 on the pillar slide 2, for movement at right angles to the movement of the pillar slide. Feed of the work supporting carriage 11 is preferably effected by means of a feed screw 13, rotatably mounted in the pillar slide 2, as indicated in Fig. 1 of the drawings. The feed screw 13 is preferably driven by magnetic clutches 14, cooperating with clutch discs 15, slidably keyed to the outer end 16 of the feed screw. This arrangement is substantially identical with the clutch mechanism of the horizontal feed screw 4, hereinbefore referred to. The clutches 14 are provided with bevel gears 17 driven by a bevel pinion 18, connected to the shaft of the motor 19, thereby providing for direct and reverse feed of the work carriage or slide 11, according to the direction of rotation of the feed screw 13. In this illustration of our improvement, the lower magnetic clutch 14 is adapted to rotate the feed screw 13 so as to feed the carriage 11 upwardly, as viewed in Fig. 1. The work which may consist of jig plates, dies, or the like is represented at 20 and may be secured to the face plate of the work carriage 11 in any well known manner, as by clips 21, as shown in Fig. 1 of the drawings.

One form of measuring device which we have found satisfactory for use in connection with our improved lay out system is illustrated as associated with the above described feed mechanisms for the purpose of laying out or locating various points on the work 20, which, as previously pointed out, is mounted on the face plate of the carriage 11, and is adapted for movement in two rectangular directions by means of the respective feed screws 4 and 13. In order to locate points horizontally, means is provided for breaking the circuit of the magnetic clutch 5, controlling horizontal feed, when the carriage or pillar slide 2 has reached a predetermined point. In the form of our device herein shown, this is accomplished by securing a bracket 22 to the frame 1 of the machine by suitable screws 23 and pivotally mounting on the bracket a contact carrying lever 24, the upper end of which is provided with a hardened stud or button 25, adapted to be engaged by any suitable engaging face, such as the end 26 of a micrometer screw 27 of the usual or any preferred type. The micrometer is mounted in an adjustable dog or block 28, slidably mounted on a rod 29, the ends of which are supported in suitable posts 30, secured to and extending from the side of the pillar slide block 2, substantially as indicated in Fig. 1. The rod 29 on which the dog is adjustably mounted is adapted to be secured in the supporting posts 30 by suitable screws 31, and the adjustable dog 28 may be secured in any adjusted position by means of a set screw 32 engaging the rod 29. Obviously, the arrangement may be reversed if desired, that is, the contact lever on the carriage and the adjustable dog on the frame.

The position of the adjustable dog 28, for determining the distance or location of the desired spot on the work from or relative to a predetermined zero position, may be accurately measured and ascertained by various standard measuring devices, as hereinafter explained. In the form of our improvement shown in Fig. 1 of the drawings, we have adopted the micrometer in connection with accurately calibrated measuring rods, this measuring arrangement being more particularly shown in Fig. 4 of the drawings. In this arrangement, it will be seen that a relatively fixed block 33 is secured by a set screw 34 to the rod 29, near one end thereof to serve as a starting point or zero, from which, the amount the adjustable dog 28 is moved along the rod may be accurately determined. The adjustable dog 28 is preferably provided with a laterally extending lug 35, which is provided with a socket, at 36, having a hardened button 37 in the bottom thereof. The relatively fixed block 33 is provided with a corresponding lug 38, which is provided with a hardened stud 29, adapted to enter the socket 36 and contact with the button 37 when the dog 28 is moved along the rod to the zero position. When it is desired to locate the dog 28 at a given adjusted position, measuring rods 40, of any desired predetermined length, may be inserted in the socket 36 and supported, in contact with the stud 39, by a suitable collar 41. Obviously, measuring rods 40 may be supplied of any convenient standard lengths, such as one, two, four, etc., inches, and a plurality of such rods may be joined together, between the socket 36 and the stud 39, by suitable connections, such as the collars 41. Ordinarily the micrometer screw 27 is adapted for adjusting the end 26 thereof over the space of one inch and, hence, with accurately calibrated measuring rods 40, and the adjustment that may be obtained by the micrometer screw 27, the distance of the end of the stud 26 from the zero block may be accurately determined. Therefore, our improved laying out system is such that the measurements are secured and accurately laid out independent of any mechanical errors in the feed screw.

It has been previously pointed out that the feed screws 4 and 13 are adapted to be rotated by the intervention of magnetic clutches 5 and 14, and, according to our method of laying out work, the feed of the respective screws is adapted to be stopped by breaking the circuit through the corresponding magnetic clutch. Therefore, the contact carrying lever 24, previously referred to, is provided with a contact 42, cooperating with a stationary contact 43 carried by a block 44 of insulating material, secured to the bracket 22, substantially as shown in Fig. 1. A spring 45 is adapted to hold the contact 42—43 normally closed. The contact carrying lever 24 is preferably grounded through the machine, as indicated at 46, while the contact 43 is connected by lead 47 with a relay magnet 48, the circuit being complete through lead 49 to the low voltage generator 50, which is grounded at 51 to complete the return circuit. An armature 52 is mounted for cooperation with the relay magnet 48, the armature being provided with a spring 53 for moving it in opposition to the attraction of the relay magnet. When the relay magnet 48 is energized, the armature 52 is adapted to be attracted so as to close a contact at 54, preferably connected with a lead 55 to an attachment plug 56, which also carries the end of a second lead 57 connected at 58 to the armature 52. By inserting the attachment plug 56 in the plug socket 59, the lead 55 is adapted to cooperate with a lead 60, and the lead 57 with a lead 61, carrying the plus side of the high voltage (110 volts) main line current, which is preferably utilized for energizing the magnetic clutches. The relay magnet 48 is adapted to control only the main line circuit through lead 60—61, to the magnetic clutch 5 at the right in Fig. 10, which, as previously pointed out, controls the feed of the pillar slide or carriage 2 from right to left. The other magnetic clutch 5 is connected by lead 62, with a double throw switch 63, to which the lead 61 is also connected, which in turn, is connected to the plus main line lead 64. The switch 63 is preferably a double throw switch, so that the main line circuit from lead 64 may be conducted through either leads 61 or 62 to energize one or the other of the magnetic clutches 5, according to the direction of feed desired for the carriage or pillar slide 2. Obviously, when the machine is operating normally, it is not necessary or desirable to have the laying out relay 48 control the main line circuit through the lead 60—61, and in that case, the attachment plug 56 is removed and a bridge plug 65 is inserted in the socket 59, thereby completing the main line circuit through 60 and 61, to the magnetic clutch 5 on the right. The circuits of the magnetic clutches 5 are completed to the negative side of the main line 66, through leads 67 and 68, as shown in Fig. 1.

In Fig. 2 of the drawings, we have shown the adaptation of our improved laying out system to a hand operated drive for the feed screws, since mechanism of this character may be readily adapted for existing machines by merely attaching the magnetic clutch hand drive to the ends of the feed screws in milling machines, planers, lathes or the like, where it is desirable to operate the feeds in connection with our improvement. With the exception of the hand operation of the magnetic clutch, the arrangement of the laying out table and the screw feeds, as shown in Fig. 2, together with the contact breaking elements for stopping the feed are substantially identical with that described in connection with the form shown in Fig. 1, and the corresponding parts are given the same reference characters. In this form, however, the respective feed screws 7 and 13 are provided with a single magnetic clutch 69, which cooperates with a disc armature 70, slidably keyed to the end of a stud shaft 71 carrying the usual handle or crank 72, for manual operation. Preferably, the stud shaft 71 may be provided with a gear 73 meshing with a pinion 74, on a stud shaft 75, rotatably mounted in the bracket 76, which also carries the bearing for the stud shaft 71, as shown in Fig. 2 of the drawings. The end of the pinion stud shaft 75 is squared, so that by applying the usual key handle, the screw may be rotated for fine adjustments. The single magnetic clutch 69 is preferably adapted to be energized by a 110 volt circuit, as with the magnetic clutches previously described, connected through the leads 77—78, on the negative side, to the relay armature 52, cooperating with the relay magnet 48, the circuit being completed from the armature through lead 79 and switch 80 to the positive side of the main line high voltage circuit 81.

The contact carrying lever 24, controlling the magnetic clutch through the relay 48, and the adjustable measuring device 28 for engaging the contact lever and breaking the circuit to control the feed through the magnetic clutches 5 and 69 connected with the respective feed screws, which have been described, as the horizontal feed in the form shown in Figs. 1 and 2, are identical with the corresponding parts controlling the vertical feeds or feed at right angles to the feed described, and the same wiring diagram and method of operation apply to both, so that it is not necessary to describe specifically the connections and arrangements for the other feed.

In Fig. 3 of the drawings, we have shown a modification of the measuring mechanism, in which the bar 29 is replaced by a graduated scale 82, upon which a vernier block 83, corresponding to the dog 28, is slidably mounted and adapted to be adjusted along the scale to lay out any required distance both for establishing the zero point and for locating exact spot on the work, where it is desired to operate with the tool. The vernier block 83 is preferably adapted to cooperate directly with the stud 25 of the contact carrying lever 24, the mechanism operating in other respects, substantially as described for the micrometer arrangement shown in connection with Figs. 1 and 2, and enlarged in Fig. 4.

It is also perfectly feasible, in connection with our improvement, to lay out the measurements by means of Johannson blocks 84, substantially as shown in Fig. 5 of the drawings, the blocks being preferably adapted to be assembled or stacked in a supporting bracket or trough 85, mounted on the machine in place of the micrometer rod 29 or vernier scale 82. The blocks 84 are preferably clamped in position by a suitable screw 86. In using Johannson blocks 84, it is desirable to mount the supporting trough 85 in such relation to the lever 24 that the blocks may cooperate directly with the hardened stud 25 on the contact carrying lever for breaking the circuit and stopping the feed in the same manner as the dog 28, as shown in Figs. 1 and 2.

It is believed that the operation of our improved laying out system will be readily understood from the description given of the mechanism, but for the purpose of illustration, we shall give a brief description of the preferred operation, which will serve as an example. Magnetic clutches for operating screw feeds, substantially as herein referred to, are well known and a description of the operation thereof, in connection with die sinking machines and the like, will be found in the patent to John C. Shaw, No. 1,506,454, of April 26, 1924, and in the application of John C. Shaw, Ser. No. 696,827, filed March 4, 1924. Let us suppose that a hole is to be bored, reamed and possibly counter-bored or otherwise operated upon at a given point A on a jig plate, represented by the work 20, in Fig. 1. The axis of the arbor, which is to be accurately located over the point A, where it is desired to operate, may be represented as at the center of the shaded circle B, which represents the end of the tool projecting toward the work from an arbor mounted in the usual taper socket of a die sinking machine, milling machine or the like. During the laying out operation, however, it may be preferable to substitute an arbor provided with an accurately ground button or spindle on its outer end, for such a spindle will more readily lend itself to calipering and measuring operations in establishing the zero. In order to locate the zero or starting point in the horizontal line, the dog 28 should be moved back substantially to its zero position with reference to the block 33 (see Fig. 4) that is, with no measuring rod 40 in between. The position of the tool or spindle B, relative to the right edge 87 which should be a finished edge, of the jig plate should then be accurately measured by suitable calipers, gauges or measuring instruments, after the pillar carriage 2 has been moved by the right magnetic clutch 5 to bring the end 26 of the micrometer into engagement with the contact lever 24 and broken the contact 42, thereby stopping the pillar carriage 2 and establishing a zero position. This will give the operator an accurate zero position from which to locate the distance of the spot A, the distance of which is known from the edge 87 of the plate. The pillar slide carriage 2 may then be moved back, that is, to the right, to the position substantially as shown in Fig. 1 of the drawings, by the operation of the left magnetic clutch 5. After the carriage is thus moved to the right the dog 28 is adjusted to the left, relative to its previously located zero position, by means of the measuring rods 40, and the micrometer 27 is adjusted until the end 26 of the latter is located at the desired distance, from the established zero which according to calculation will give the distance of the point A from the starting edge 87. The right magnetic clutch 5 is then placed in operation and the carriage 2 will again move to the left until the end 26 strikes 25 of the contact lever 24 and breaks the contact 42—43, thus stopping the carriage with the axis of the arbor centrally of the circle C, which, it will be seen, is on the vertical line of the point A to be located. As soon as the feed of the carriage is stopped in this manner, it will be seen that the horizontal position of the point A is accurately located without any further calculations or manipulations by the operator.

It will be noted that, in Fig. 1, the point A, to be operated upon, is below the line between B and C, and, therefore, it is necessary to move the work supporting carriage 11 upwards a predetermined amount in order to locate the point A on the vertical line through C. This is accomplished in the same manner as described for the horizontal line. In other words, the zero position of the lower edge 88 of the jig plate, which like the edge 87 is a finished edge, should be determined for measurements are to be made from this edge. The dog 28 on the vertically moving carriage 11 is first adjusted to locate the zero position of the lower edge 88 of the jig plate, after which the upper magnetic clutch 14 is operated to move the carriage 11 down, say to the position shown in Fig. 1, where the end B of the arbor or tool is represented on a horizontal B—C line above the point A to be located. Measuring rods 40 are then inserted between the dog 28 and the fixed block 33 and the micrometer 27, on the vertical carriage, is adjusted to bring the end 26 thereof to a point corresponding to the distance between the established zero point, and the location desired for the tool over the point A, that is, the vertical distance between the finished edge 88 and the point A on the jig plate. Then the lower magnetic clutch 14 is placed in operation and the carriage will move upward to bring the tool to the position indicated by the dotted circle D, provided the horizontal movement has not already been effected. It will be seen, however that if the two measured adjustments horizontal and vertical, are made prior to starting the feed of either carriage, and both the right magnetic clutch 5 and the lower magnetic clutch 14 are placed in operation at the same time, the jig plate 20 will be moved relative to the tool center B to bring the latter exactly over the point A. By this method, it will be seen that we have provided a simple, efficient and highly accurate method of locating various points on work to be operated upon by various tools without depending upon thimbles or other devices, which involve the possibility of error in setting or from wear or inaccurately cut screw threads, or the like. Obviously, by operating the respective carriages 2 and 11, for establishing the horizontal and vertical zero points, by breaking the contacts 42—43 and stopping feed movement of the respective carriages, and then directly measuring, from these established zero points, the distances required to locate point A from the finished edges 87 and 88 of the jig plate, the point A or any other desired points can and will be located by measurements entirely under the control of the operator, and errors will be eliminated because both the established zero and the points A to be located are determined by breaking contacts 42—43 and stopping the carriages under identical conditions. This will be true whether using the vernier scale, shown in Fig. 3, or the Johannson blocks, shown in Fig. 5, or the micrometer 27 and measuring rods 40, shown in Fig. 4, and previously described, for when the respective carriages are stopped by breaking of the contacts 42—43, for locating the points, the respective screws are used merely as feeding elements and have nothing whatever to do with the measurements or with laying out the measured distance.

The operation of our improvement with the manually driven clutches, as illustrated in Fig. 2, will be substantially identical with the operation described in connection with the laying out system of Fig. 1, the difference being that the single clutch 69 for the respective screws may be used for reversing the feed, after the circuit therethrough has been broken by breaking the contacts 42—43, when the switch 80 is thrown to complete the circuit through lead 89. The hand operated form of our improvement, substantially as shown in Fig. 2, may be adapted for use as a laying out table by placing the carriage 11 horizontal, so that the two feed movements are at right angles to each other in a horizontal plane. When arranged in this manner, the apparatus may be placed on the table of a drill press and used for locating points where holes are to be drilled, or our improvement may be used directly in connection with a radial drill.

It will be obvious that the direction of movement of the carriages, during the laying out of the various points to be located, may be opposite to the directions previously described, provided the measuring devices and contact points are correspondingly reversed. It will also be understood that in laying out various points, the established zero may be ascertained by measurements from the opposite edges of the jig plate from those we have described in giving the operation of our improvement, and such changes or modifications in the method of operation will be understood and may be readily carried out by those skilled in the art.

Furthermore, it will be obvious that we do not wish to be limited to the specific details of construction, for various modifications therein may be made without departing from the spirit and scope of the invention.

We claim:—

1. A laying out system for machine tools wherein a work table is provided with feed mechanism adapted to be operated by an electro-magnetically controlled clutch in circuit with a contact which, when broken, is adapted to stop the feed, said contact and the work table being relatively movable by said feed mechanism; which comprises means for breaking said contact by relative movement between the work table and contact to establish the zero point, and means for adjustably moving said last named means a measured amount corresponding to the distance of the point to be located from the established zero, the arrangement being such that upon again breaking said contact by relative movement between the work table and contact the desired point is located.

2. A laying out system for machine tools, wherein a work table is provided with feed mechanism adapted to be operated by an electro-magnetically controlled clutch in circuit with a contact, which, when broken by a dog adjustable on and movable with the work table is adapted to stop the feed, said contact and the work table being relatively movable by the feed mechanism; which comprises means for establishing a zero point by permitting said dog, moving with the work table, to break the contact, thereby stopping the feed, and means for adjusting said dog relative to its initial position, which becomes the established zero, a measured amount corresponding to the distance therefrom of the point to be located, and again permitting said dog to break the contact by relative feed movement of the work table, whereby the distance between the two points at which the contact is broken corresponds to the predetermined measured distance of the point to be located from the established zero point.

3. The system of laying out work in co-operation with the feed movement of machine tools, which comprises a work table upon which the work is fixed, feed mechanism therefor, means for operating the feed mechanism through the medium of an electro-magnetically controlled clutch, stop mechanism mounted in part on the machine frame and part on the work table including a lever carrying a contact in the circuit controlling said clutch and a dog adapted to engage said contact carrying lever for breaking the contact by relative feed movement of the work table under the action of said feed mechanism and measuring means for adjusting the relative distance between said contact lever and dog after said contact has been broken by such movement to establish a zero point, said adjustment being such as to locate the desired point to be laid out at a predetermined measured distance from the zero point, so that upon again breaking the circuit by effecting engagement between the dog and contact lever, by relative feed movement therebetween, the work is stopped at the desired point.

4. The system of laying out work in co-operation with the feed movement of machine tools, which comprises a work table upon which the work is fixed, feed mechanism therefor, means for operating the feed mechanism through the medium of an interposed electro-magnetically controlled clutch, stop mechanism mounted in part on the machine frame and part on the work table including a contact carrying lever for breaking the circuit of said clutch controlling the feed movement of the work table and adjustable dog for engaging said contact lever for breaking the circuit, said contact lever and said dog being relatively movable by action of said feed mechanism, said feed being operated for establishing a zero point for said adjustable dog and means for locating and securing said dog at a measured distance from and relative to the established zero point, thereby to lay out the point desired, the work being stopped at the latter point by another engagement between said dog and the contact lever, under the action of said feed mechanism.

5. The system of laying out work in cooperation with the feed movement of machine tools, which comprises a work table upon which the work is fixed, power means for feed movement of the work table, an electro-magnetically controlled clutch interposed in said power means for effecting the feed movement, stop mechanism including a contact carrying lever mounted on the machine frame, the contact of which is adapted, under the action of a spring, to close an electric circuit for controlling said clutch and an adjustable element mounted on said work table for movement therewith by the feed movement to engage said lever, the arrangement being such that a zero point relative to the work is adapted to be established by a preliminary adjustment of said adjustable element and then permitting the work table to move under action of its feed movement to break the contact by moving said contact lever, and means for adjusting said adjustable element a measured distance relative to said established zero to locate the desired point to be laid out on the work, the arrangement being such that under further action of the feed movement, said adjustable element will again engage said lever to break the contact and stop the feed when the carriage has moved the required distance.

6. The laying out system as claimed in claim 5, in which said adjustable element comprises a vernier block, adapted to be adjusted on a scale associated with the work table for establishing the zero point and for subsequently locating the point to be laid out on the work.

7. The laying out system as claimed in claim 5, in which said adjustable element is adjustably mounted on the work table for adjustment parallel to the direction of feed movement, and its position of adjustment along the work table is determined from a fixed point by means of standard measuring devices.

8. The laying out system as claimed in claim 5, in which the circuit directly controlling the clutch is adapted to be operated on a relatively high voltage and the contact carrying lever operates on a relatively low voltage circuit including a relay controlling the high voltage circuit.

9. A laying out system for locating work at predetermined points for operation thereon in machine tools, which comprises feed mechanism for moving the work, means for operating said feed mechanism, a clutch interposed between the feed mechanism and said operating means, means adapted to be operated by feed movement of the work for opening said clutch and stopping said feed movement, means adapted to cooperate with said clutch opening means to operate the same, said clutch opening means and the operating means therefor being relatively movable by said feed movement of the work, measuring devices mounted parallel with the direction of feed movement of the work for positioning by said relative movement one of said last named means for establishing the zero point and from the latter locating the work at the point to be operated upon.

10. A laying out system for locating work at predetermined points to be operated upon by machine tools, comprising a table for supporting the work, feed mechanism for moving said table and the work, means for operating said feed mechanism, a magnetic clutch between said feed mechanism and its operating means, contact devices for completing the circuit of said magnetic clutch, means adjustable along said table for operating said contact devices for breaking the circuit of and opening said clutch by movement of said table, and measuring devices cooperating with said adjustable means for locating the latter so as to open said clutch and stop the work in the predetermined position to be operated upon.

JOHN C. SHAW.
ROBERT D. SHAW.